(12) United States Patent
Bares

(10) Patent No.: US 6,732,829 B2
(45) Date of Patent: May 11, 2004

(54) LOAD ABSORBING OPERATOR RESTRAINT BAR

(75) Inventor: Mark F. Bares, Oakes, ND (US)

(73) Assignee: Clark Equipment Company, Woodcliff Lake, NJ (US)

( * ) Notice: Subject to any disclaimer, the term of this patent is extended or adjusted under 35 U.S.C. 154(b) by 0 days.

(21) Appl. No.: 10/186,482

(22) Filed: Jul. 1, 2002

(65) Prior Publication Data

US 2003/0127268 A1 Jul. 10, 2003

Related U.S. Application Data

(60) Provisional application No. 60/345,831, filed on Jan. 4, 2002.

(51) Int. Cl.$^7$ ............................................. B60R 21/10
(52) U.S. Cl. ........................ 180/271; 180/268; 280/751
(58) Field of Search ................................ 280/748, 753, 280/751; 180/268, 269, 270, 271, 281; 104/241; 297/464, 470, 487, 488

(56) References Cited

U.S. PATENT DOCUMENTS

| | | | |
|---|---|---|---|
| 2,755,101 A | 7/1956 | Budde | 280/150 |
| 3,431,995 A | 3/1969 | Kiernan | 180/82 |
| 3,494,633 A * | 2/1970 | Malloy | 280/749 |
| 3,741,330 A * | 6/1973 | Monaghan | 280/753 |
| 3,888,329 A * | 6/1975 | Monaghan | 280/734 |
| 3,993,157 A | 11/1976 | Schulte | 180/111 |
| 4,008,626 A | 2/1977 | Schulte et al. | 74/491 |
| 4,388,980 A | 6/1983 | Vig et al. | 180/271 |
| 4,391,344 A | 7/1983 | Weber et al. | 180/271 |
| 4,392,660 A | 7/1983 | Mason et al. | 280/751 |
| 4,397,371 A * | 8/1983 | Lynnes et al. | 180/271 |
| 4,480,713 A | 11/1984 | Macht et al. | 180/268 |
| 4,537,274 A | 8/1985 | Parquet | 180/270 |
| 4,579,191 A | 4/1986 | Klee et al. | 180/268 |
| 4,603,877 A | 8/1986 | Espinoza et al. | 280/807 |
| 4,955,452 A | 9/1990 | Simonz | 180/271 |
| 5,050,700 A | 9/1991 | Kim | 180/268 |
| 5,100,173 A | 3/1992 | Kudler | 280/748 |
| 5,129,478 A | 7/1992 | Suenaga et al. | 180/268 |
| 5,383,532 A | 1/1995 | Shonai et al. | 180/269 |
| 5,454,596 A | 10/1995 | Dirck | 280/748 |
| 5,481,909 A | 1/1996 | Deutsch et al. | 73/117.3 |
| 5,664,637 A | 9/1997 | Ohta et al. | 180/286 |
| 5,871,063 A | 2/1999 | Young | 180/268 |
| 5,944,135 A | 8/1999 | Blackburn et al. | 180/268 |
| 6,299,207 B1 | 10/2001 | Bares | 280/748 |
| 2001/0030074 A1 * | 10/2001 | Sauermann | 180/271 |

FOREIGN PATENT DOCUMENTS

| | | | | |
|---|---|---|---|---|
| GB | 2 328 268 A | | 7/1998 | |
| JP | 62128853 A | * | 6/1987 | B60R/21/08 |

* cited by examiner

Primary Examiner—Michael J. Carone
Assistant Examiner—Gabriel S. Sukman
(74) Attorney, Agent, or Firm—Westman, Champlin & Kelly, P.A.

(57) ABSTRACT

An operator restraint bar or seat bar has side arms that are pivotally mounted to a rear wall of a loader cab, and a front lap bar. The restraint bar is mounted with a spring that will absorb energy when the front lap bar is moved in a forwardly direction. A spring also provides forces for urging the seat bar assembly to a working or restraining position. After the seat bar assembly has been pivoted away from its working position a desired amount, the spring urges the seat bar assembly toward a raised position. In one form of the invention, a single spring on each side arm performs all of the functions of absorbing energy and urging the restraint bar toward its working position and after initial upward movement, toward a raised position. The energy absorption can be accomplished by spring loading the vertical and horizontal arm section in various ways, so a change in angle between them adds energy to an energy absorbing member.

20 Claims, 6 Drawing Sheets

LOAD ABSORBING OPERATOR RESTRAINT BAR

The present application refers to and claims priority from U.S. provisional patent application Serial No. 60/345,831, filed Jan. 4, 2002, the content of which is hereby incorporated by reference in its entirety.

CROSS REFERENCE TO RELATED APPLICATIONS

Reference is made to U.S. Pat. No. 6,299,207, issued Oct. 9, 2001, for Rear-Mounted Operator Restraint Bar, and the disclosure is incorporated by reference.

BACKGROUND OF THE INVENTION

The present invention relates to an operator restraint bar for vehicles, primarily industrial vehicles, which are attached to the rear wall of an operator cab, and include a front cross-bar that is ahead of the abdomen of an operator when the operator is seated, and which includes impact energy absorbing components in the restraint bar.

Various operator restraint bars have been advanced in the art for self-propelled loaders and other work vehicles. The restraint bars are pivotally mounted on an operator cab structure, and generally are U-shaped or L-shaped, and are movable from a disengaged position where they permit the operator to leave the operator seat, to an operator restraining position. The restraining position may be tied in with a system that reduces the likelihood that the loader or vehicle can be operated unless the seat bar is in its proper restraining position.

A rear mounted seat bar that pivots upwardly from the restraining position to adjacent the roof of the cab is described in the above-identified U.S. Pat. No. 6,299,207. A cross bar that will restrain the operator from unintentional forward movement is rigidly connected to the pivoting arm portions that disclosure is acknowledged as prior art.

SUMMARY OF THE INVENTION

The present invention relates to a restraint bar assembly that is pivotally mounted to the rear wall of the work vehicle and has at least one side arm and a front cross bar. As shown two are formed in a generally U-shape. The side arms extend downwardly from the pivotal mounting and join horizontal arm portions when the restraint bar is in its working or restraining position. The cross bar spans or extends across the width of the seat, and is in front of a seated operator when in restraining position.

In the present invention, the cross bar is mounted to the mounting portions of the restraint bar assembly through a joint that is loaded with a spring or cushioning member to act as a energy absorbing link when the operator is moved forwardly by momentum loads or forces. Absorbing energy caused by external forces will tend to reduce loads on the restraint bar. The cross bar will be permitted to move only a limited amount for energy absorption, and thereafter will be held rigidly to function to restrain an operator from an impact.

The same spring used for energy absorption, can be used for urging the restraint bar assembly to its working position, and after the restraint bar assembly has been rotated upwardly a desired amount, the spring force will "go over center" and will act to urge the restraint bar assembly to its raised or clearance position.

The restraint bar assembly can be made with one or two springs to accomplish the energy absorption, and the spring loaded joints that operate as energy absorption sections can be located in desired positions to obtain the action wanted as well.

DETAILED DESCRIPTION OF THE PREFERRED EMBODIMENTS

The mountings of the restraint seat bar assembly, and the general construction of the rear mounted restraint bar including working position stops and the like are shown in U.S. Pat. No. 6,299,207, issued Oct. 9, 2001, the disclosure of which is incorporated herein by reference.

Figure 1:
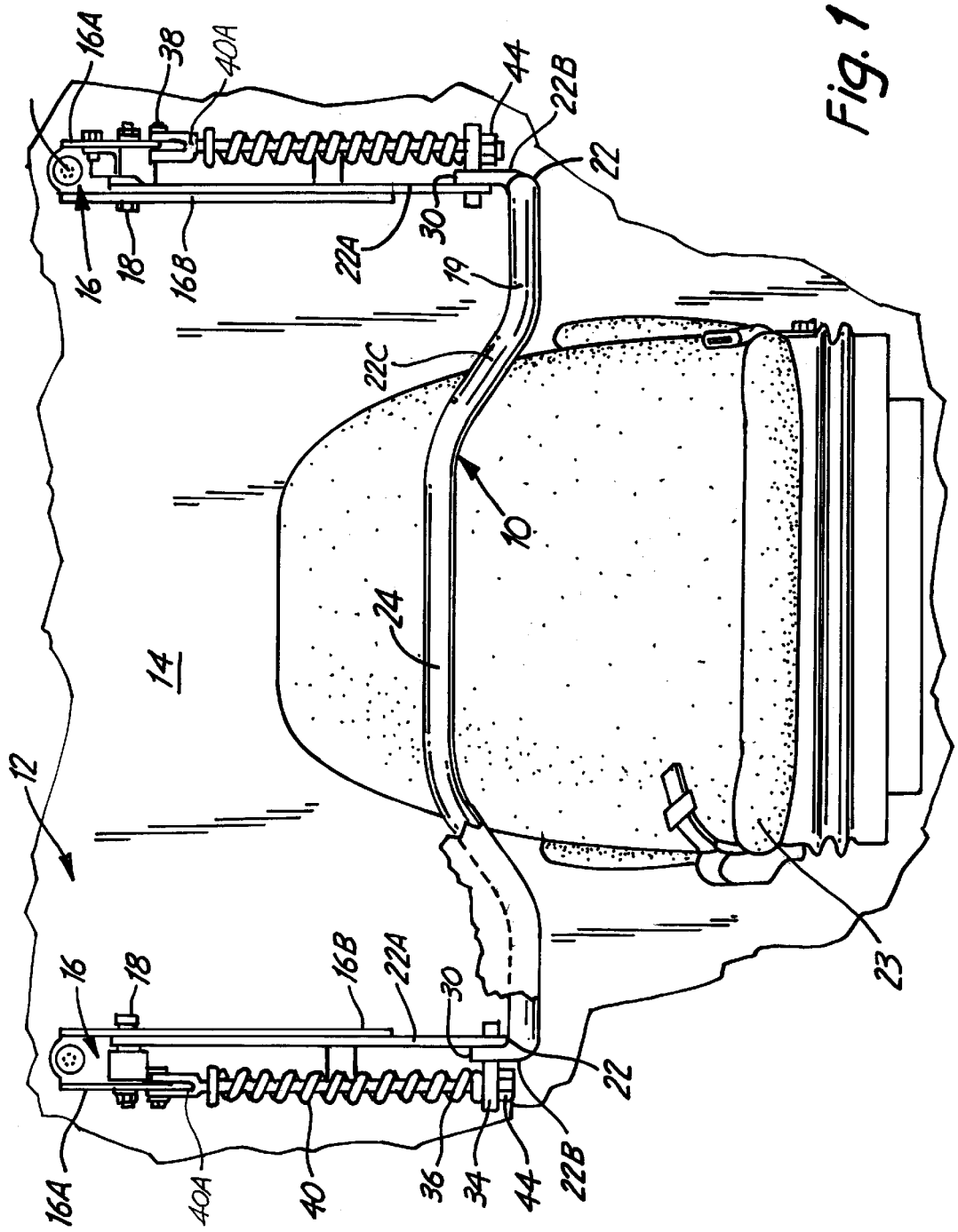
FIG. 1 is a schematic front view of a typical operator restraint bar assembly made according to the present invention.

Referring to FIG. 1, the operator restraint bar assembly of the present invention illustrated generally at 10 is mounted on a cab 12 of a vehicle, such as a skid steer loader. The cab 12 has a rear wall 14 on which a pair of laterally spaced brackets 16 are fixed for mounting the restraint bar assembly 10. The brackets 16 have parallel, spaced legs 16A and 16B, and the inner legs 16B are used for pivotally mounting the restraint bar assembly about pivot pins indicated at 18 (See FIG. 2), and the pins permit the U-shaped restraint bar 19 to swing from a working position shown in FIGS. 2 and 3 in solid lines, to a raised or clearance position which is illustrated in FIG. 3 in a dotted line representation at 21.

In its working or restraint position, the restraint bar 19 acts as a forward restraint for an operator indicated generally at 20, sitting on a seat 23 in the cab 12.

The U-shaped restraint bar 19 is made with jointed side arms, in the first form of the invention. As shown in FIG. 1, the restraint or seat bar 19 has side arms 22, and a front cross bar 24. In this form of the invention, the side arms 22 are divided into first sections 22A and second sections 22B that are pivotally mounted together at 26 at the lower end of the first or upright side arm sections 22A. The horizontal side arm sections 22B are integrally joined with the cross bar 24, and as can be seen, the side arm sections 22B have upwardly inclined portions 22C that position the cross bar 24 in a proper location for restraining the operator 20.

The pivot connections 26 are between arm sections 22A and 22B on each side of the restraint bar and each side includes a pivot bracket 30 that is at the rearward end of the respective arm sections 22B. Each pivot bracket 30 has an extension arm portion 34 that is suitably positioned to permit a spring 36 to be mounted against the upper surface of the extension arm section 34. A rod or shaft 40 extends through the spring. One end of the rod 40 has a clevis 40A pivotally mounted pivot point shown at 38 to the side flange 16A of the bracket 16. The rod 40 extends through an opening in the extension arm section 34 and the end of the rod 40 is threaded and is held in place with a nut 44. The nut 44 on each rod 40 can be adjusted to change the effective length of the rod and this adjusts the position or inclination of the side arm section 22B and thus the front cross member height can be adjusted. The springs 36 will resist any pivoting of the arm sections 22B about the pivots 26 tending to increase the included angle between the arm sections 22A and 22B, which compresses the springs 36. Both arm sections 22B pivot relative to their respective upper arm sections at the same time. The nuts 44 stop the pivoting in counter clockwise direction about pivot 26.

The position of the pivot 38 for the rods 40 and springs 36 relative to the pivot 18 for the upper ends of the restraint bar arm sections 22A also insures that the spring force from spring 36 will tend to rotate the upper arm sections 22A (and thus the restraint bar assembly 10) in a clockwise direction, when the restraint bar nears its working position. This will urge the restraint bar assembly 10 to restrain the operator. As the restraint bar assembly is manually lifted and pivoted about the pivots 18, toward a raised position where the operator can get out of the seat, the spring force from the springs 36 goes over center because of the positioning of the pivots 18 and 38 and the spring force reaction point at extension arm section 34. After the spring 36 force has gone over center, at about the position shown by line 56 in FIG. 3, the spring force will tend to move the restraint bar assembly 10 toward and keep it against the roof 12A (FIG. 3) of the cab 12 until the restraint bar assembly is manually pulled down and moved to its working position. The manual raising of the restraint bar assembly 10 does not cause the arm sections 22A and 22B to pivot about pivot 26 relative to each other.

Figure 2:
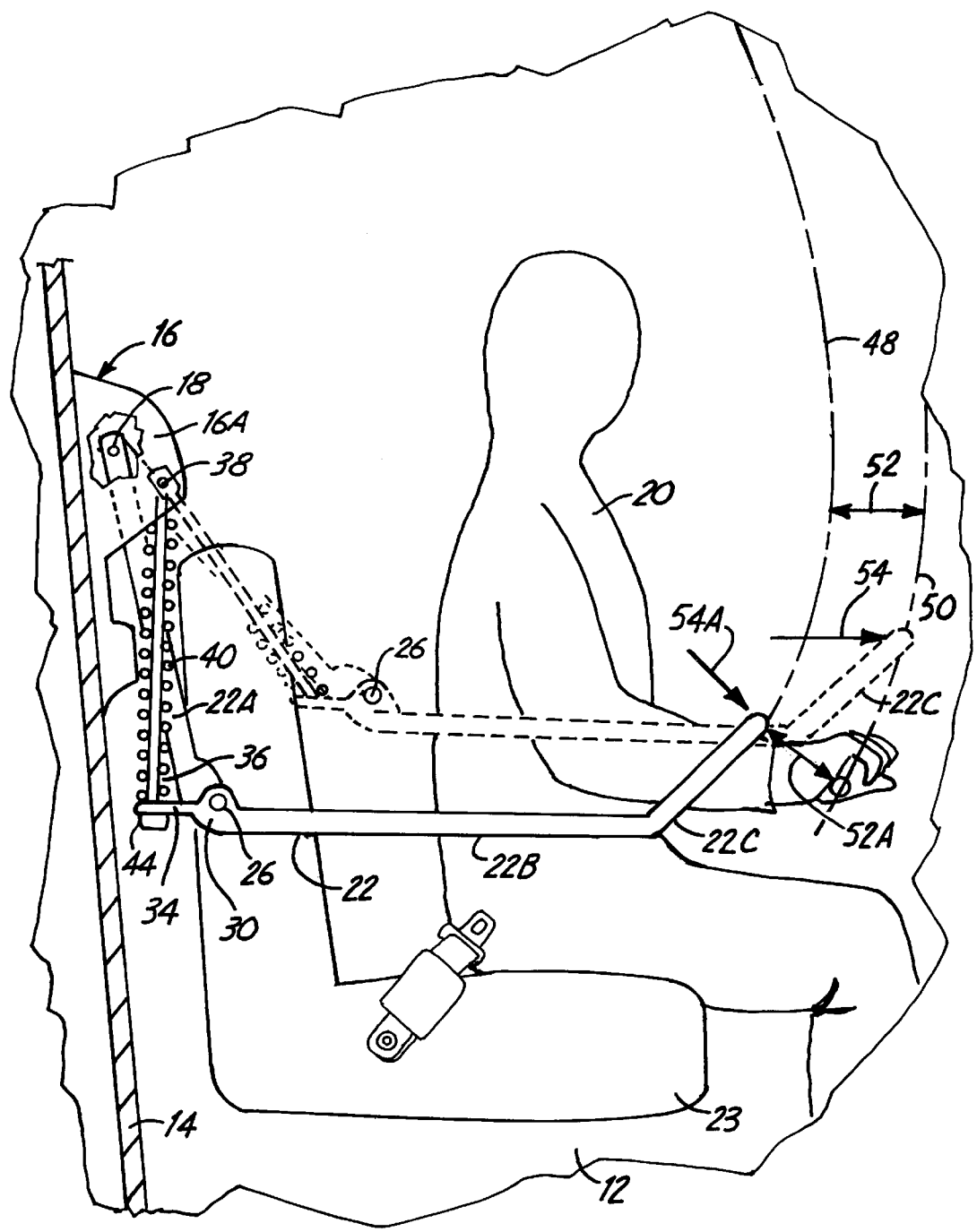
FIG. 2 is a schematic side elevational view of the restraint bar in FIG. 1 showing the energy absorbing movement and characteristics of the restraint bar.
Figure 3:
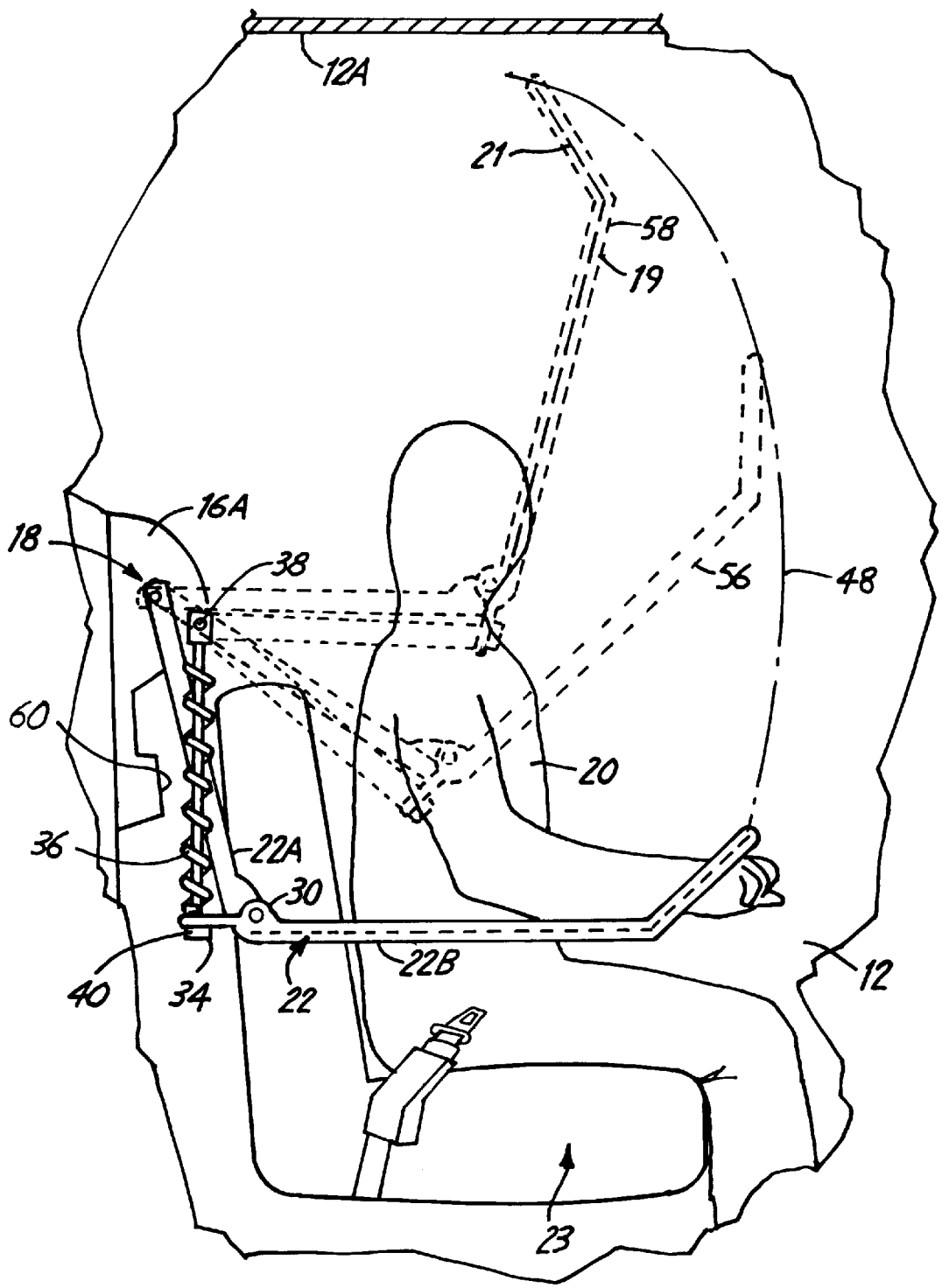
FIG. 3 is a schematic side view similar to FIG. 2 showing exemplary restraint bar positions, including an over center pivoted position wherein the restraint bar assembly is spring loaded to its clearance position from its working position.

The operator 20 is positioned so that the cross bar 24 is in front of the abdomen, and if the operator is moved forward against the cross bar 24, as shown in FIG. 2, the force in that forward direction will tend to make the restraint bar arm assembly 10 pivot about the pivot 18, and at the same time, there will be a force tending to cause pivoting of the restraint bar arm sections 22B in a clockwise direction about the pivots 26 relative to restraint bar arm sections 22B. This pivoting about the pivots 26 will be resisted by the springs 36, which will tend to compress and which also resist pivoting about pivot 18.

The increase in the angle between arm sections 22A and 22B caused by this pivoting may continue until the springs 36 become fully compressed, or "bottom out". This bottoming out position is approximately as shown in dotted lines in FIG. 2. The spring force continues to act on the restraint bar assembly to resist pivoting about pivot 38 in a counter clockwise direction. The path of travel of the restraint bar assembly, without pivoting about the pivots 26, is indicated by the line 48 in FIGS. 2 and 3. The path of travel showing the maximum deflection forwardly of the cross bar 24 caused by pivoting of the arm sections 22A and 22B about pivot 26 until spring 26 bottoms out or a stop is incurred, is indicated along the path 50 in FIG. 2. Permissible movement of this maximum deflection for energy absorption is also indicated by double arrow 52 in FIG. 2. This represents a deflection zone where energy that would be causing the forward movement of the cross bar 24 will be absorbed by the springs 36. At the position where the springs 36 will be bottomed out or become essentially solid, the restraint bar assembly will act as a rigid restraint bar as in the prior art, and will not pivot upwardly from forward force indicated by the arrow 54 any farther. Then the bar will restrain the operator from any forward movement beyond that position of the cross bar.

In other words, the energy that may be generated by the operator sliding forwardly to engage the cross bar is absorbed in a short distance of movement as represented by double arrow 52, before full restraint is achieved. When loads in the direction of arrow 54 decrease or are released, the springs 36 will return the restraint bar assembly to its position shown in solid lines in FIG. 2, and the restraint bar then can be raised upwardly to travel along the line 48 to its operator clearance position.

It should be noted that the geometry of the parts can be selected to modify the force/deflection curve or relationship to meet different restraint profiles.

Pivoting of the restraint bar assembly about the pivot 18 is also illustrated in FIG. 3. The working position is shown in solid lines, and corresponds to the working position in FIG. 2. The dotted line representations show the movement along the travel or trajectory line 48 of the restraint bar to its raised or clearance position. At position indicated by the dotted line 56 in FIG. 3, the springs 36 will be in such a position that the axis of the rod 40 that supports the spring (and the spring reaction points) will be aligned along a line between the pivot 18 and the pivot 38, and any further upward movement will mean that the force of spring 36 will tend to urge the restraint bar assembly upwardly in a counterclockwise direction to its fully raised position indicated by the dotted line 58.

This raising action is very similar to that which was described in the application cross referenced above.

Thus, using a single spring 36, or one on each side of the restraint bar assembly, the action of the rear mounted operator restraint bar will be to urge the restraint bar to a stopped position, against a rubber bumper or stop shown at 60 mounted on the bracket 16 in one direction. When the seat bar is raised toward its raised or elevated position by the operator a sufficient amount along its path of travel indicated by the line 48, the spring will urge the seat bar to a fully raised position.

Figure 4:
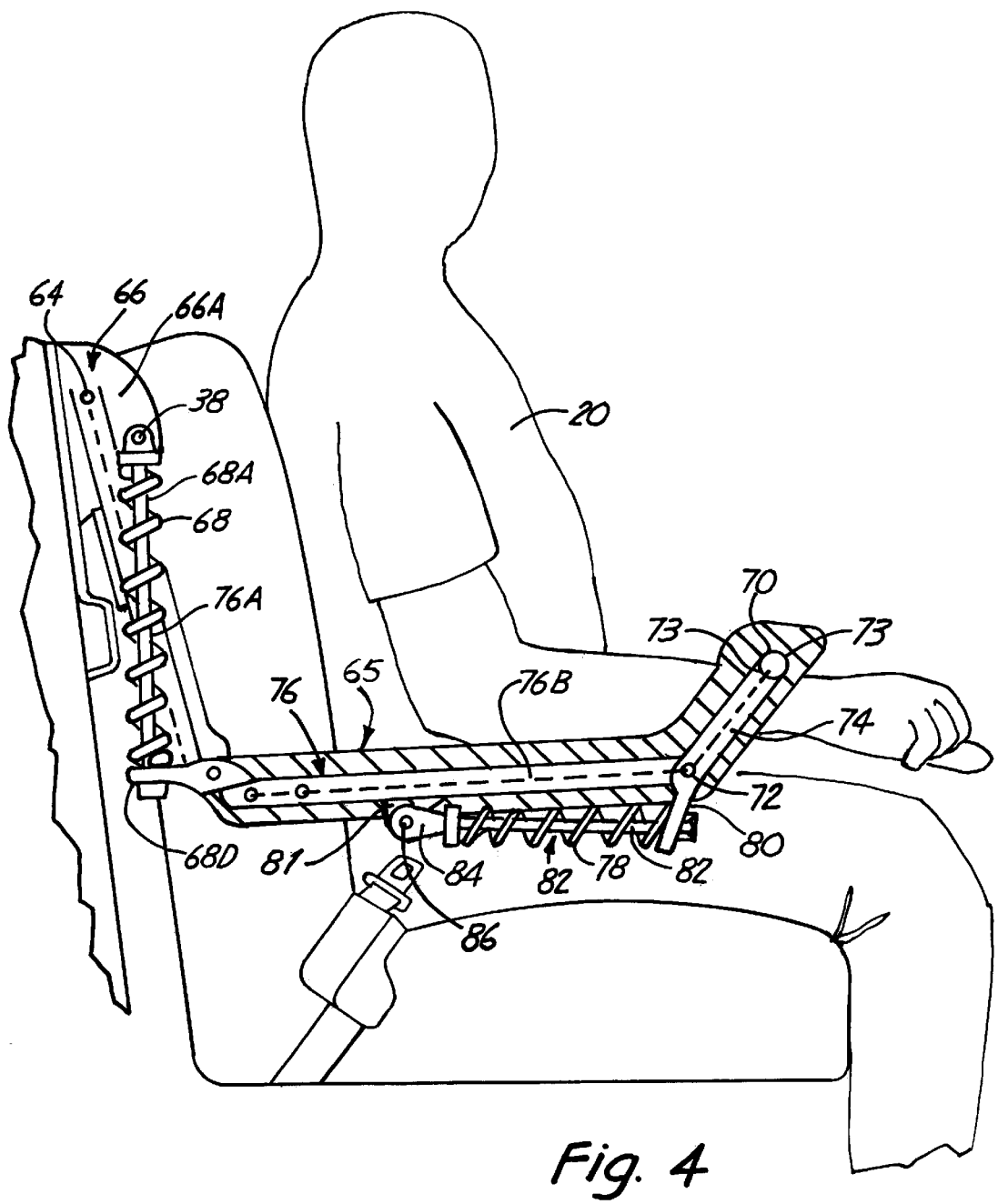
FIG. 4 is a schematic side elevational view of a modified form of the invention.
Figure 5:
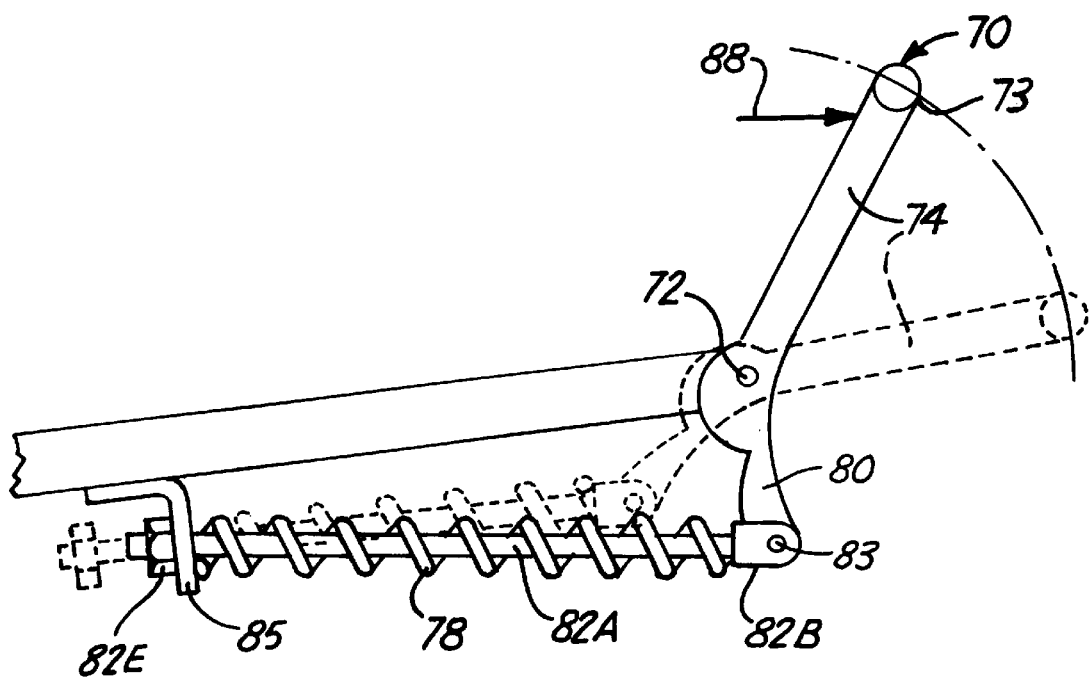
FIG. 5 is an enlarged view showing a jointed cross bar mounting used with the device of FIG. 4; and, FIG. 6 is a fragmentary side view of a further modified form of the invention.

In FIGS. 4 and 5, a modified form of the invention is illustrated. A rear pivot restraint bar assembly 65 has side arms 76 that are pivotally mounted on brackets 66 on the rear wall of a cab at a pivot 64 for the rear pivot restraint bar assembly 65. In this form, there is a front cross bar or lap bar assembly 70, which has been modified from the first form and is pivotally mounted as at 72 to the lateral or forwardly extending arm sections 76B of the side arms 76 on opposite sides of the restraint bar assembly. Short end legs 74 are used to space the cross bar 73 upwardly from the pivot 72. The pivot 72 pivotally mounts the legs 72 of cross or lap bar assembly 70 to the lateral arm sections 76B that are part of the rear pivot restraint bar assembly 65. The lateral arm sections 76B are fixed to upright arm sections 76A. The side arms 76 will raise and lower about the pivot 64. The side arms can be spring loaded as desired with a spring 68 mounted on a rod 68A that is pivoted to a leg 66A of bracket 66 at 38A. The rod 68A extends through an opening in a spring reaction bracket 68D. The spring 68 reacts force to the restraint bar assembly through that bracket.

The cross bar assembly 70 is mounted so that it will absorb energy from forward loads by use of springs 78 that are mounted on shafts 82 that pass through openings in arms or brackets 80. There are springs on each side of the restraint bar assembly. The shaft or rod 82 shown has an end clevis 84 that is pivotally mounted as at 86 to a leg 81 on the horizontal arm section 76B of the restraint bar assembly 65.

As shown in FIG. 5, schematically, the cross bar 73 and the arms 74 can move to the dotted line position when there is load acting on the cross bar in a forward direction, as indicated by the arrow 88. This pivoting will compress the spring 78. The arms 74, which carry the bracket or arm 80, move to the dotted line position, compressing the spring 78 along the rod or shaft 82A. The spring absorbs energy as the cross bar assembly 70 pivots about the pivot 72. The spring 78, as shown in FIG. 5, is mounted in a different manner from FIG. 4. The rod 82A has a clevis 82B that is pivoted to arm or bracket 80 at a pivot 83. A fixed bracket 85 is attached to arm section 76B and rod 82A slides through an opening in the bracket 85 as the cross bar assembly pivots from the dotted line position. The rod 82A has a nut 82E to hold it in position.

The energy absorbing cross bar or lap bar is at the outer ends of the side arm portions 76B of a rear mounted seat bar assembly 65 that will pivot between a working position with the arm portions horizontal, to a raised position with the cross bar against the cab roof to permit the operator access to the seat. It also can be mounted onto a fixed arm rests (non pivoting) that have horizontal sections 76B padded for operator arm support. The energy absorbing cross bar assembly 70 then would be a restraint bar that hinged on one horizontal arm section and extended across the lap of the operator or person seated on the seat, and latched to the other horizontal arm section. The operator also should wear a seat belt that is shown in the drawings.

FIGS. 2, 3, and 4 show the operator failing to follow the manufacturer's instructions to use the primary restraint system, which is the seatbelt, or lap belt (as shown but not numbered), and thus resulting in greater amounts of kinetic energy of the operator's body that must be absorbed by the seatbar. With a lap belt fastened the abdominal forces from contact with the seatbar are significantly reduced because a large portion of the kinetic energy of the operator is absorbed by the seatbelt. This invention will also further improve comfort to the lap seatbelted operator because the seatbar is capable of deflecting downward after a certain downward force is exerted at the front of the seatbar. When the machine unexpectedly impacts a solid object while traveling forward at a high velocity, the lap seatbelted operator's abdomen will pivot clockwise about the seatbelt generating force vector 54A (FIG. 2) against the seatbar and deflecting the seatbar forward and downward indicated by deflection the double headed deflection arrow 52A. This is considered improved comfort because force levels indicated by lap seatbelted operator force vector 54A are much less than unseatbelted operator force vector 54.

Figure 6:
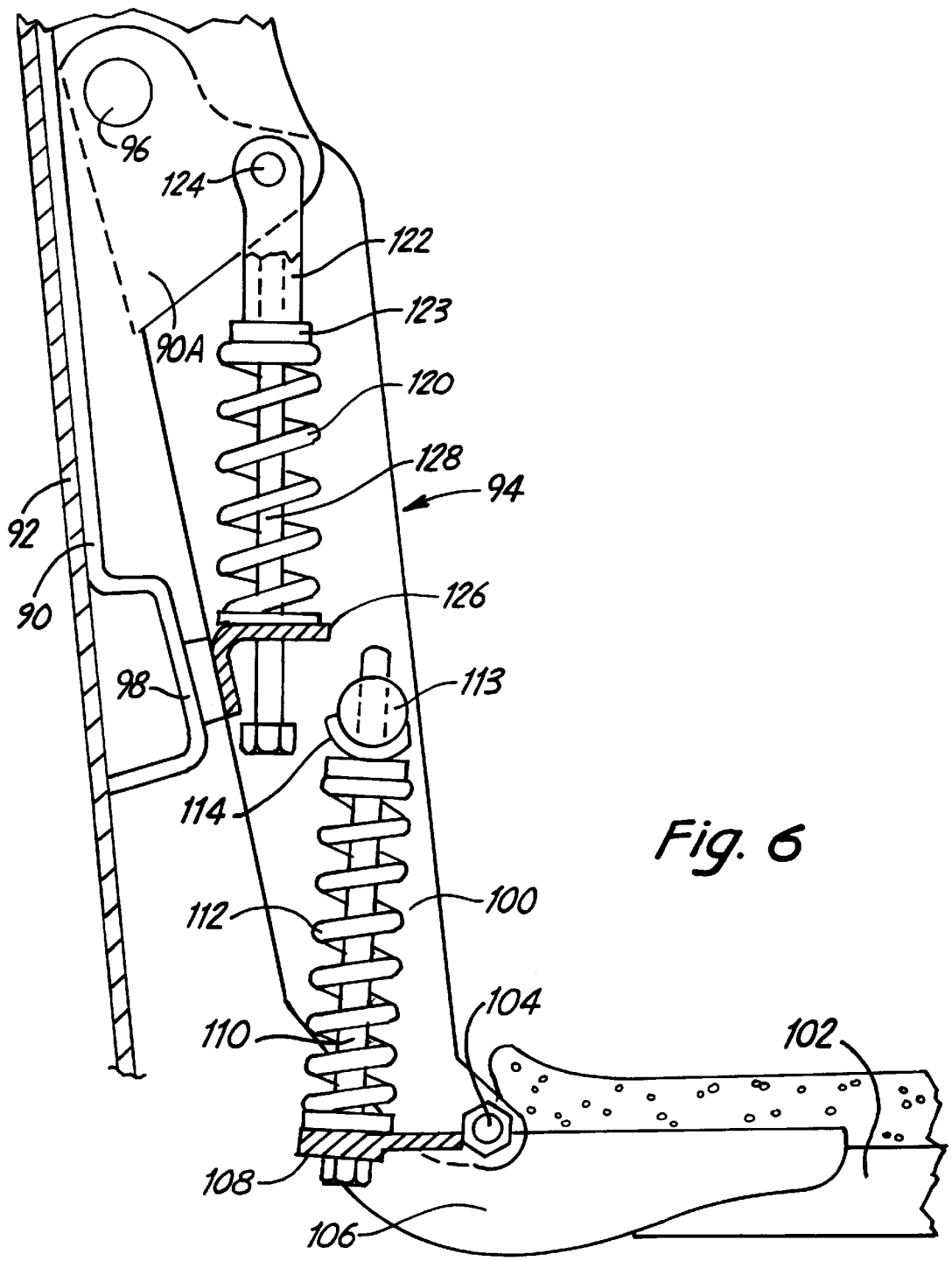

FIG. 6, is a schematic side view of the mounting end of a restraint bar made according to a modified form of the present invention. In this form of the invention, the rear mounted restraint bar brackets 90 are mounted on the rear wall 92 of a cab. The brackets 90 have channels at the top and have a pair of legs, as previously shown, that will pivotally mount a seat bar assembly 94 which is shown only fragmentarily, about a pivot 96. The bracket 90 has a formed stop member 98 that is spaced from the cab rear wall and which is used for stopping upright sections or arm portions 100 of the seat bar assembly 94 in a working or restraint position.

In the working position, a horizontal arm portion 102 of the restraint bar assembly 94 is in a restraint position where the cross bar or leg bar restrains an operator. The horizontal arm portion 102 has an inverted channel bracket 106 at its inner end that is pivotally mounted to the upright arm section 100 on a pivot pin 104.

The inverted channel bracket 106 has a rearwardly extending arm or lever portion 108 that has a cross wall that has an opening to receive a long cap screw or threaded rod 110 that has a spring 112 surrounding it. The spring 112 seats against a part cylindrical flange 114 that is integral with the upright arm portion 100, and is positioned above the pivot 104. The cap screw 110 passes through an aperture in the flange 114 to guide the spring 112 and threads into a retainer block 113 seated on the flange 114. The spring 112 is positioned to clear the walls of the upright arm portion 100. Adjusting bolt 110 will result in raising or lowering the cross bar carried by side arm portions 102.

Additionally, a separate spring 120 is provided for controlling the pivoting of the seat bar assembly 94 about the pivot 96. Spring 120 is mounted on a rod or cap screw 128 that attached to a clevis 122 that is pivoted to the outer flange 90A of the bracket 90 at a pivot 124. Pivot 124 corresponds in position to the pivot 38 in the first form of the invention. The spring 120 reacts against a support flange or wall 126 that is fixed to the side wall or walls of the upright arm portion 100 in alignment with stop wall 98. The rod or cap screw 128 passes through an aperture in the support wall 126, and holds the spring 120 in a centered position. The spring 120 acts against a flange 123 on the clevis 122 into which the rod 128 is threaded. The spring 120 will act to urge the restraint bar assembly 94 to the working or restraint position shown in FIG. 6. The pivoting of the restraint bar downward is stopped in the position shown in FIG. 6 by the stop 98. The pivot 124 and the spring reaction point on bracket 126 go over center or across the plane defined by pivots 124 and 96 as the seat bar is moved between its working position and its raised position in the same manner as previously explained. After the spring force line crosses the plane of pivots 96 and 124, the spacing urges the restraint bar assembly upwardly.

The energy absorption or forces loading the cross or lap bar forwardly in this form of the invention will cause the horizontal arm portion 102 to tend to pivot clockwise about the pivot 104 relative to upright arm portion 100, which will compress the spring 112. The spring 112 will absorb energy to resist this pivoting movement. At the same time the upright arm portion 100 will pivot in counter clockwise and move away from stop 98. This also absorbs some energy causing spring 112 to compress.

However, the spring 112 will bottom out, or become solid when the horizontal arm portion 120 has pivoted so the spring travel distance designed into the system has been completed, and then the two arm portions 100 and 102 will form a fixed restraint bar assembly as previously shown.

The restraint bar assembly can be manually raised and lowered between its working and raised positions. The spring 120 will urge the restraint bar assembly to the working position as the seat bar assembly is lowered. When the restraint bar assembly is raised the spring 120 goes "over center" and will urge the restraint bar assembly to a raised or clearing position.

It should be noted that in the first form of the invention, the single spring can be of a desired length, and spacers can be placed between the spring and either one of its anchored ends, to provide an appropriate spring rate, and to insure that the spring will bottom out (fully compress and become solid) to provide a stop so that the restraint arm portion essentially become rigid as it is loaded in a forward direction, after the bar has pivoted to its position for energy absorption.

The restraint bar shown has two sections, but it could have two or more sections arranged with a pivot point and one or more sets of springs or elastic tension or compression devices such that deflection of a second member or additional members with respect to the first member or previous members can be influenced by the force and deflection characteristics of the spring or elastic device. Also the corresponding mounting of the elastic device and pivot geometry with respect to the first, second or more members will influence deflection of the members about their pivots.

A typical spring force vs. deflection curve is linear and force increases with deflection. Energy is a force applied over a distance, and an object in motion has a certain amount of kinetic energy. Thus, given force levels applied over a distance are required to reduce the velocity of a moving object to zero. There are also optimum maximum force levels that certain areas of the human body can withstand with reduced risk of injury. The present restraint system is aimed at restraining an operator, and the geometry of the restraint bars is optimized such that a desired force level is achieved quickly from initial deflection, and then maintained at that level or slightly increasing levels until overall restraint conditions prevent further deflection of the restrain bar sections. This application of the restraint bar assembly optimizes the geometry to "level" out the force vs. deflection curve at some force level until a given amount of deflection is achieved. This concept could also be applied to seatbelt mounting points on vehicles or on other types of restraint systems.

The term "spring" is defined as including the springs shown, gas springs, rubber/elastomeric compression elements, wave washers, belleville springs and other elastic loading tension or compression devices.

Although the present invention has been described with reference to preferred embodiments, workers skilled in the art will recognize that changes may be made in form and detail without departing from the spirit and scope of the invention.

What is claimed is:

1. A load absorbing restraint bar assembly for a seat comprising at least one side arm, the side arm having a first side arm portion, and a second arm portion coupled to the first side arm portion, the second arm portion having at least a section extending upwardly in a restraint position to a pivot point to a rear of the restraint bar assembly and above the first side arm portion, the first side arm portion having a transversely extending restraint bar that in the restraint position restrains loads in a forward direction, and a resilient loading member acting between the transversely extending restraint bar and the second arm portion to resiliently restrain movement of the transversely extending restraint bar in a forward direction relative to the second arm portion when the transversely extending restraint bar is subjected to a load in a forward direction.

2. The load absorbing restraint bar assembly of claim 1, wherein said resilient loading member comprises a spring.

3. The load absorbing restraint bar assembly of claim 2, wherein said spring is a compression spring and is mounted on a bracket about a second pivot that is offset from the pivot point of the second arm portion, said spring being mounted to exert a force to load the restraint bar assembly downwardly in the working position and after the restraint bar assembly is raised a selected amount the spring force acts to urge the restraint bar assembly to a raised position.

4. A load absorbing restraint bar assembly for a seat comprising at least one side arm, the side arm having a first side arm portion, and a second arm portion movably coupled to the first side arm portion, the second arm portion having at least a section extending upwardly from the first arm portion to a pivot point at a rear of the restraint bar assembly, the first side arm portion having a transversely extending restraint bar that in a restraint position restrains loads in a forward direction, and a resilient loading member acting between the transversely extending restraint bar and the second arm portion to resiliently restrain movement of the transversely extending restraint bar in a forward direction relative to the second arm portion when the transversely extending restraint bar is subjected to a load in a forward direction, wherein the first side arm portion is pivotally connected to the second arm portion about a second pivot, and the resilient loading member restrains pivoting of the first side arm portion relative to the second arm portion.

5. The load absorbing restraint bar assembly of claim 1 wherein there are two side arms, each having two portions, and the first side arm portions being integrally formed with the transversely extending restraint bar portion into a generally "U" shape.

6. The load absorbing restraint bar assembly of claim 2, and a bracket for supporting the at least one side arm, the at least one side arm being pivotally mounted to the bracket at the pivot point comprising a first pivot point, and said spring being pivotally mounted to the same bracket at a second pivot off-set from the first pivot point, the second end of said spring engaging the restraint bar assembly at a spring loading point, the second pivot and the spring loading point being arranged with respect to the first pivot point such that as the restraint bar assembly approaches a working position, the spring urges the restraint bar assembly toward such working position, and as the restraint bar assembly is raised away from the working position, the first pivot point, the second pivot, and the spring loading point reach a position wherein they lie on a common plane, and upon further raising movement of the restraint bar assembly the spring loading point moves to an opposite side of such common plane from its position in the working position of the restraint bar assembly, to thereby cause the spring to urge the restraint bar assembly to continue to raise.

7. The load absorbing restraint bar assembly of claim 6 wherein the first side arm portion and second arm portion are pivotally coupled at a third pivot, and wherein the spring loading point creates a moment on the first side arm portion about the third pivot.

8. A load absorbing restraint bar assembly for a seat having a forward end and a rear back rest, the restraint bar assembly having a first arm portion, and a second arm portion movably coupled to the first arm portion, one of the arm portions having at least a section extending upwardly to a pivot connection at a rear of the restraint bar assembly, the first arm portion comprising a transversely extending restraint bar that in a restraint position restrains loads in a forward direction, and a resilient loading member acting between the transversely extending restraint bar and the second arm portion to resiliently restrain movement of the transversely extending restraint bar in a forward direction relative to the second arm portion when the transversely extending restraint bar is subjected to a load in a forward direction, wherein said resilient loading member comprises a spring acting between the second arm portion and the first arm portion to resist relative movement between the first arm portion and the second arm portion.

9. The load absorbing restraint bar assembly of claim 8 wherein the first and second arm portions are urged to a stopped position by the spring, and an adjustment device to adjust the stopped positions to change the position of the end of the second arm portion opposite from the pivot.

10. The load absorbing restraint bar assembly of claim 8 wherein there is a second spring acting to exert a force to urge the second arm portion to move about the pivot point.

11. The load absorbing restraint bar assembly of claim 10, wherein the first arm portion and second arm portion are pivotally coupled about a second pivot and a stop member for stopping pivoting of the second arm portion relative to the first arm portion about the third pivot in a working position.

12. The load absorbing restraint bar assembly of claim 10 wherein the first and second arm portions are urged to a stopped position by the spring acting between the second arm portion and the first arm portion, and an adjustment device to change the stopped position of the second and first arm portions relative to each other.

13. A load absorbing restraint bar assembly for a seat comprising a pair of brackets adapted to be mounted on a wall of a vehicle having the seat, a U-shaped restraint bar assembly comprising a pair of spaced apart side arms joined by a transversely extending restraint bar supported on the side arms, the side arms each having a rear portion pivotally mounted to a respective bracket about a first pivot, the side arms each having a first generally upright section and a second generally horizontal section pivotally mounted together at a rear end of the second generally horizontal section, and at least one spring associated with a side arm, the at least one spring having an end pivotally mounted on a bracket associated with the at least one side arm at a second pivot spaced from the first pivot, and the spring being coupled to the restraint bar assembly at a second end thereof to exert a force that simultaneously creates a moment about the second pivot between the first and second arm sections, and about the first pivot to resist pivoting between the first and second arm sections when a load is applied to the transverse extending restraint bar in a direction away from the brackets, and also to resist pivotal movement about the first pivot of the restraint bar assembly.

14. The load absorbing restraint bar assembly of claim 13 wherein said spring is a compression spring.

15. The load absorbing restraint bar assembly of claim 14 wherein the spring is coupled to provide a moment on the second horizontal arm section, that resists increasing an angle between longitudinal axes of the first and second side arm sections.

16. The load absorbing restraint bar assembly of claim 15 and a stop for stopping pivotal movement of the second arm section relative to the first arm section beyond a selected position when the second arm section is pivoted by the force of the spring.

17. The load absorbing restraint bar of claim 16 and an adjustment device for changing the position of the stop to adjust the position of the first and second arm sections relative to each other.

18. A restraint bar assembly for a seated operator on a seat having a forward side comprising at least two restraint bar sections pivotally connected together about a first pivot connection, one of the sections adapted to be mounted to a seat support, the one section extending along a lateral side of a seated operator, a resilient member connected to control deflection between the at least two sections about the first pivot when loads in a forward direction on the restraint bar assembly tend to change a relative angular positions of the at least two sections, to thereby resiliently restrain loading in a forward direction causing pivotal movement as a function of force versus deflection characteristics of the resilient member.

19. The restraint bar assembly of claim 18 wherein said two sections have lengths that are held at angular position in a rest position, the angular relationship of the lengths, and the force versus deflection characteristics being selected to provide a desired change in the amount of pivoting of the two sections for each unit of force as the sections pivot in one direction.

20. The restraint bar assembly of claim 18, wherein a second of the at least two sections is pivotally mounted to a forward end of the one section and has a portion extending parallel to an axis of the first pivot connection, wherein the portion is positioned forwardly of a seated operator.

* * * * *

UNITED STATES PATENT AND TRADEMARK OFFICE
CERTIFICATE OF CORRECTION

PATENT NO.   : 6,732,829 B2  
DATED        : May 11, 2004  
INVENTOR(S)  : Mark F. Bares Page 1 of 1

It is certified that error appears in the above-identified patent and that said Letters Patent is hereby corrected as shown below:

<u>Column 4,</u>
Line 49, "legs 72" should be -- legs 74 --.

<u>Column 10,</u>
Line 18, "positions" should be -- position --.

Signed and Sealed this

Fourth Day of January, 2005

JON W. DUDAS
*Director of the United States Patent and Trademark Office*